Nov. 28, 1967   H. DE KERIVILY   3,355,571
DEVICE FOR THE PRODUCTION OF AEROSOLS
Filed April 6, 1965
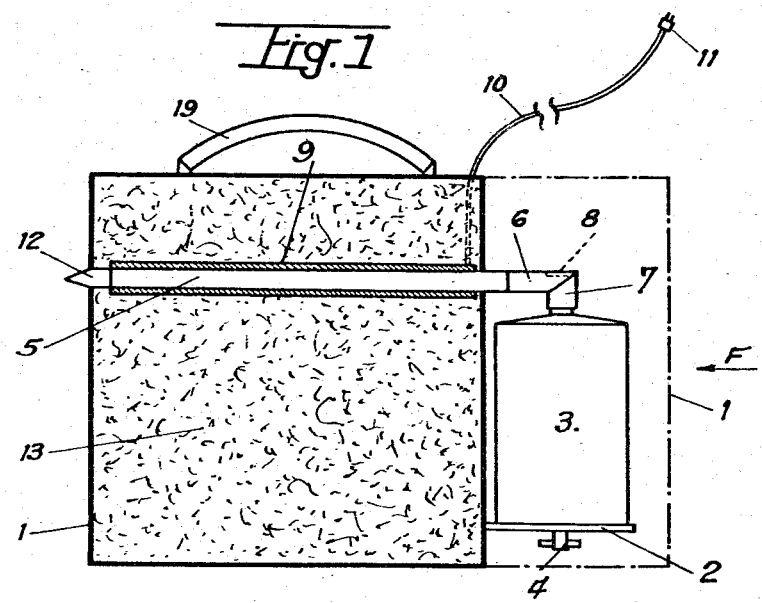
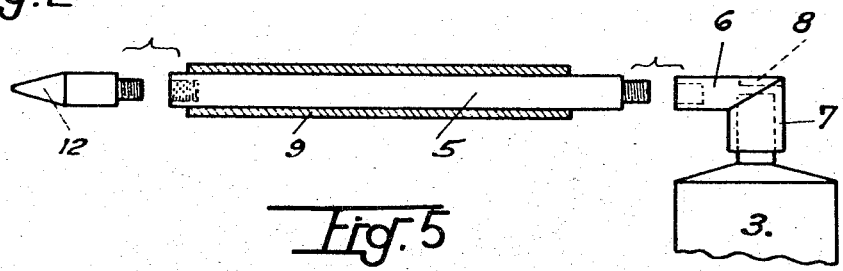
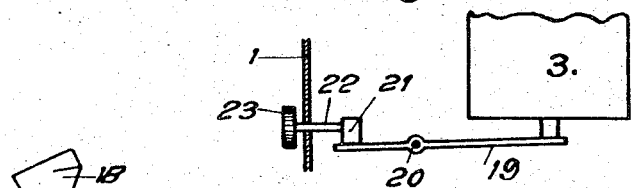
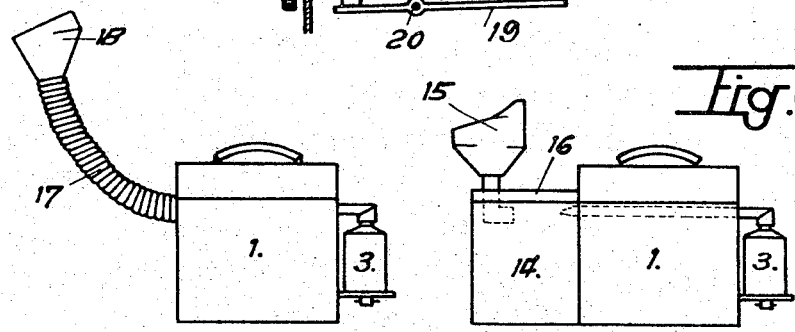
INVENTOR
HENRY de KERIVILY
by Woodhams Blanchard & Flynn
ATTORNEYS _United States Patent Office_

3,355,571
Patented Nov. 28, 1967

3,355,571
DEVICE FOR THE PRODUCTION OF AEROSOLS
Henry de Kerivily, 12 Rue Angelique-Verien,
Neuilly-sur-Seine, France
Filed Apr. 6, 1965, Ser. No. 445,894
Claims priority, application France, Apr. 7, 1964,
970,052, Patent 1,402,924
2 Claims. (Cl. 219—214)

This invention relates to a device for the production and diffusion of aerosols, and more especially dry aerosols which can be employed for a number of different purposes such as, in particular, the disinfection of premises or therapeutic fumigations.

It is well known to prepare and diffuse aerosols. However, aerosols usually consist of fine droplets of water or similar liquid which contain the active products in solution and which are therefore liable either to produce deposits and thus to soil the walls of a room in which they are dispersed or to be unfit for use as medical aerosols on account of the size of particles of which they are formed and/or on account of the presence of a liquid carrier.

The device for the production of aerosols in accordance with this invention makes it possible on the contrary to obtain dry aerosols and consequently circumvents all of the above-mentioned disadvantages as well as many others of like nature.

The device according to the invention essentially comprises the combination of a pressure container for discharging the solution to be sprayed in the form of a mist, a tube into which the mist thus discharged is directed, and suitable heating means associated with said tube.

The use of a pressure container, or more generally of a device for producing a mist as a result of the expansion of a gas is attended by a large number of unexpected advantages. Among these can be mentioned in particular:

Elimination of all spraying devices for the production of mist such as compressed-air tanks, electric pumps, nozzles and the like in addition to the corresponding pipes, thereby dispensing with the need for periodic cleaning of such components.

The pressure container constitutes a non-returnable package and can be immediately replaced.

The pressure container ensures complete reliability in the preparation of the product contained therein and guarantees that this latter is in fact the product originally made by the manufacturer and prevents any contamination thereof prior to its use.

Since the mist or atomized spray is formed as a result of the sudden expansion of a gas or of a highly volatile liquid, its temperature is very low before passing into the heating tube. The heat which is received by the mist and which is employed mainly for the purpose of evaporating the solution of active product does not bring said product to a temperature above 30° C. in respect of a temperature of approximately 110–115° C. of the atmosphere of the tube.

It is thus possible to obtain dry aerosols starting from solutions of products which are very sensitive to heat.

The pressure container can be an aerosol dispenser of known type which contains the solution of product to be sprayed and a gas under pressure which is intended to discharge said liquid from the dispenser-can in the form of a mist or finely atomized spray; preferably, both the liquid and gas contained in said dispenser-can are non-flammable. Subject to this precaution, the can or pressure container referred-to can be of a conventional type in which pressure is applied on the dispensing valve head or spraying head of the pressure container so as to release an atomized spray which is produced by the discharge of liquid under the action of the gas under pressure.

It is preferable to ensure that the valve-head of this pressure container is so designed that the delivery of liquid is approximately in the range of 0.3 to 1.5 cubic centimeters per second, although these limits are not critical.

The combination of tube and heating device essentially comprises a tube which is designed to be coupled to the head of the pressure container, means for heating said tube and heat-insulating material surrounding said tube and its heating means with a view to maintaining said tube at a suitable temperature. As will be readily apparent, the device can be fitted with a temperature-regulating system or thermostat which is placed inside the tube and which permits the possibility of regulating the temperature of the tube to the desired value in each particular case.

The heated tube can communicate directly with the atmosphere, for example by way of a nozzle.

When it is more especially required to produce dry aerosols of medicinal products, the nozzle referred-to above can either open directly into a respirator or into a chamber which serves as an aerosol collector and which is in turn connected to a respirator.

In an advantageous form of embodiment of the invention, the assembly of the heated tube and the aerosol dispenser or pressure container can be so adapted as to ensure that the displacement of the pressure container initiates the operation thereof. In particular, this displacement can cause the valve-head of the pressure container to bear against a portion of the member which serves to join the tube to the pressure container, thus actuating the container valving mechanism. As a particular feature, the junction can be carried into effect by means of an elbowed tube against the wall of which the valve-head can be applied.

Whatever form of embodiment may be adopted, care is taken to ensure that the junction between heating tube and valve-head of the pressure container is effected in such a manner that a sufficient clearance is afforded to the mixture which is expelled from the container to ensure that the mist or finely atomized spray is formed before passing into the heating tube.

Further characteristic features of the invention will be brought out in the description which follows below, reference being made to the accompanying drawings which are given solely by way of non-limitative example and in whcih:

FIG. 1 is a view in sectional elevation of one form of embodiment of the present invention;

FIG. 2 is a view in position of assembly of the elements for heating and discharging of the aerosol;

FIGS. 3 and 4 are views in diagrammatic sectional elevation of two alternative forms of said device;

FIG. 5 is an alternative form, looking in the direction of the arrow F of FIG. 1, of one mode of operation of the container valve head.

As shown more especially in FIG. 1, the device in accordance with the invention comprises a chamber 1 on the outer wall of which is fixed a bracket 2 for supporting an aerosol dispenser or pressure container 3, said bracket being designed, for example, in the form of a platform on which said container rests. For a reason which will be explained below, there can be passed through the above-mentioned platform a bolt having a head which is either knurled or provided with wings 4; said bolt is adapted to bear against the bottom of the pressure container 3.

There is disposed within the chamber 1 the heating tube 5 which extends from the pressure container to the exterior and which is connected to said container by means of a connector tube 6. Said connector tube has a right-angled elbow and the second branch 7 thereof is adapted to fit over the valve-head of the pressure container 3. At least the tube 6 has a sufficient volume to ensure the formation of mist as the product is discharged from the container. The head of said container 3 is applied against an internal projection formed in the vicinity of the elbow 8 of said tube, thereby actuating the container valving mechanism as will be explained hereinafter. The tube 5 is surrounded by an electric resistance 9 which is supplied with current through a lead-wire 10 and plug-connector 11. Finally, the discharge nozzle 12 is located at the opposite extremity of the tube 5. As a preferable feature, the interior of the chamber 1 is packed with glass-wool, as shown at 13.

The supply of current through the lead-wire 10 can be controlled by a thermostat, for example by a bi-metallic strip placed inside the tube 5 in such a manner that, when the interior of the tube has reached a predetermined temperature, the current supply can be cut off and then subsequently restored whenever this should prove necessary.

The apparatus which has just been described operates as follows: when the tube 5 has been brought to the desired temperature, the bolt 4 is screwed up, thus lifting the pressure container 3 and applying the head of said container against the projection 8. A finely atomized spray is therefore discharged from the container.

As a preferable feature, the free end of the welded portion 7 of the connector tube is fitted with a sealing member such as a rubber washer which is applied against the top of the container.

The mist or vapor produced by the spray discharge of the solution contained in the pressure container is heated as it passes through the tube 5; the liquid in which the active products are present evaporates, with the result that a dry aerosol composed of extremely fine particles is discharged through the nozzle 12.

As shown in FIG. 2, the different elements which have just been described, in particular the tube 6 on the one hand and the tube 5 on the other hand and finally the nozzle 12 are preferably assembled in such a manner as to permit of subsequent disassembly, said assembly being carried out, for example, by screwing.

The aerosol which is delivered from the apparatus can be discharged directly into the atmosphere through the nozzle 12.

In an alternative form which is shown in FIG. 3, and which is especially directed to the production and utilization of an aerosol having a therapeutic action, this aerosol can be collected in a chamber 14 to which a respirator 15 is connected through the opening formed in the cover 16 of said chamber 14. By means of this expedient, those particles contained in the aerosol which are too large either in volume or in weight can accordingly be deposited in the bottom of the chamber 14 without being inhaled by the patient.

Provision can also be made as shown in FIG. 4 for a flexible hose of large diameter such as the hose 17 which terminates in a mouthpiece 18, said mouthpiece being designed to fit over the patient's mouth and nose. The hose 17 is mounted directly at the outlet of the nozzle 12 and those aerosol particles which may be either too large or too heavy can also be deposited in said tube.

As can be observed from the drawings, this apparatus readily constitutes a portable unit which can be carried by means of the handle 19 fixed at the top of the chamber 1.

As will be apparent, the pressure container is chosen according to the particular use for which the apparatus is intended and can have different capacities, for example of the order of 250 cubic centimeters in the case of medicinal sprays or up to a value of the order of one liter in the case of disinfectants to be sprayed in apartments, stables and so forth.

With the above object in view, the member 2 which supports the pressure container can comprise a system of adjustment for height of the container base with respect to the chamber 1, thus making it possible to adapt the apparatus to the various heights of different pressure containers which may be employed therein.

In the alternative form of FIG. 5, the pressure container 3 is placed head downwards and the head rests on the lever 19 which is pivoted at 20; said lever is operated by a cam 21 which is keyed at the end of a rod 22. Said rod passes through the wall 1 and its movement of rotation is controlled from the exterior by means of the knob 23. The jet is discharged from the head of the container at right angles to the plane of the drawing so as to be directed into the tube 5.

In this last-mentioned form of embodiment as in the form of embodiment of FIG. 1, the container head can be located at a distance of the order of one centimetre from the inlet of the tube without being materially connected to said inlet.

As will be readily understood, the modes of execution of the invention which have just been described have been given only by way of example and not in any limiting sense, and any detail modifications can be made therein without consequently departing from the scope or the spirit of the invention.

What I claim is:

1. A device for the production of dry aerosols from solutions, which comprises:
  - a pressure container for discharging the solution under pressure, said pressure container having a projecting head through which the solution is discharged;
  - a first conduit mounted at one end thereof on said head and extending away therefrom, said first conduit having an enlarged free space therewithin into which the solution flows and becomes present as a mist therein, said first conduit further including a first portion slidably sleeved on said head and a second portion extending at an angle to said first portion, said enlarged free space being formed in said second portion;
  - a second conduit mounted on the other end of said first conduit and extending away therefrom;
  - a frame for supporting said container, said frame including an enlarged enclosure surrounding and spaced from said second conduit and insulation means filling said enclosure surrounding said second conduit; and
  - heating means associated with said second conduit for heating and drying the mist flowing therethrough.

2. A device according to claim 1, in which said first conduit is fixed against movement with respect to said frame and including means for moving said container toward and away from said first conduit.

References Cited

UNITED STATES PATENTS

| | | | |
|---|---|---|---|
| 2,914,221 | 11/1959 | Rosenthal | 219—301 XR |
| 3,098,925 | 7/1963 | Fouts et al. | 219—214 |
| 3,116,403 | 12/1963 | Carter | 219—301 |
| 3,134,191 | 5/1964 | Davis | 222—146 |
| 3,207,369 | 9/1965 | Rossi | 222—146 XR |

ANTHONY BARTIS, *Primary Examiner.*